(12) United States Patent
Henning et al.

(10) Patent No.: US 11,384,807 B2
(45) Date of Patent: Jul. 12, 2022

(54) BRAKE CALIPER FOR A VEHICLE BRAKE, ADJUSTER UNIT, GEARWHEEL AND ADJUSTER NUT FOR A BRAKE CALIPER

(71) Applicant: WABCO Europe BVBA, Brussels (BE)

(72) Inventors: Paul Henning, Schwetzingen (DE); Przemyslaw Kowalski, Wroclaw (PL)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 59 days.

(21) Appl. No.: 16/985,246

(22) Filed: Aug. 5, 2020

(65) Prior Publication Data
US 2021/0041000 A1 Feb. 11, 2021

(30) Foreign Application Priority Data

Aug. 5, 2019 (EP) ..................................... 19189967

(51) Int. Cl.
| | |
|---|---|
| *F16D 65/16* | (2006.01) |
| *F16D 65/18* | (2006.01) |
| *F16D 55/226* | (2006.01) |
| *F16D 65/00* | (2006.01) |
| *F16D 65/097* | (2006.01) |
| *F16D 65/56* | (2006.01) |
| *F16D 55/00* | (2006.01) |

(52) U.S. Cl.
CPC ......... *F16D 65/183* (2013.01); *F16D 55/226* (2013.01); *F16D 65/0068* (2013.01); *F16D 65/0971* (2013.01); *F16D 65/567* (2013.01); *F16D 2055/0016* (2013.01)

(58) Field of Classification Search
CPC .. F16D 65/0006; F16D 65/0075; F16D 65/18; F16D 65/183; F16D 65/567; F16D 65/568; F16D 65/16
USPC .............................. 188/71.7–71.9, 72.7–72.9
See application file for complete search history.

(56) References Cited

U.S. PATENT DOCUMENTS

| | | | |
|---|---|---|---|
| 6,820,730 B2* | 11/2004 | Angerfors | ............. F16D 65/568 188/71.9 |
| 2015/0184708 A1* | 7/2015 | Camilo-Martinez | ... F16D 65/52 188/71.8 |
| 2021/0040999 A1* | 2/2021 | Henning | ............. F16D 55/2255 |

FOREIGN PATENT DOCUMENTS

WO   WO 2014029488 A1   2/2014

* cited by examiner

*Primary Examiner* — Christopher P Schwartz
(74) *Attorney, Agent, or Firm* — Leydig, Voit & Mayer, Ltd.

(57) ABSTRACT

A brake caliper for a vehicle brake is provided. The vehicle brake includes a pair of brake pads, configured to be coupled to the brake caliper, and a disc positioned between the brake pads. The brake caliper includes an adjuster unit mounted to the brake caliper. The adjuster unit includes a gearwheel configured to be rotary driven in a first direction, and an adjuster nut operatively coupled with the gearwheel and configured to be operatively coupled with one of the brake pads, such that a rotational movement of the gearwheel in the first direction is converted, by the adjuster nut, into an axial movement of the brake pad towards the disc. The gearwheel is mounted in the brake caliper such that the gearwheel is axially fixed relative to the brake caliper, while the adjuster nut and the gearwheel are in an axially slidable engagement with respect to one another.

11 Claims, 10 Drawing Sheets

BRAKE CALIPER FOR A VEHICLE BRAKE, ADJUSTER UNIT, GEARWHEEL AND ADJUSTER NUT FOR A BRAKE CALIPER

CROSS-REFERENCE TO PRIOR APPLICATIONS

This application claims priority to European Patent Application No. EP 19189967.3, filed on Aug. 5, 2019, the entire disclosure of which is hereby incorporated by reference herein.

FIELD

The invention relates to a brake caliper for a vehicle brake, in particular an air disc brake of a commercial vehicle, the vehicle brake having a pair of brake pads configured to be coupled to the brake caliper and a disc positioned in between the brake pads, wherein the brake caliper has an adjuster unit mounted to the brake caliper, the adjuster unit comprising: a gearwheel configured for being rotary driven in a first direction, and an adjuster nut operatively coupled with the gearwheel and configured to be operatively coupled with one of the brake pads, such that the rotational movement of the gearwheel in the first direction is converted by the adjuster nut into an axially movement of the brake pad towards the disc.

BACKGROUND

Brake calipers for vehicle brakes of the aforementioned type are generally known in the art and typically employed in trucks, buses and bikes. Upon receiving an actuation signal, for example, from a brake pedal in the driver cabin or from an electronic control unit, a braking force is generated by the brake cylinder and transmitted to the brake caliper and the thrust piece. After overcoming an air clearance between brake pedals and a brake disc, a frictional force is then applied by an inner brake pad advanced by the thrust piece to the rotating brake disc of the brake. At the same time, a frictional force is applied by an outer brake pad advanced by the brake caliper to the brake disc.

In known brake calipers an adjuster unit is used to control the air clearance. In such adjuster units the gearwheel is fixed on the adjuster nut such that the gearwheel is moving axially with each actuation. As the adjuster motor is fixed relative to the brake caliper, an exact positioning of the gearwheel is needed to ensure a proper torque transmission from the adjuster motor to the gearwheel.

SUMMARY

In an embodiment, the present invention provides a brake caliper for a vehicle brake. The vehicle brake includes a pair of brake pads, configured to be coupled to the brake caliper, and a disc positioned between the brake pads. The brake caliper includes an adjuster unit mounted to the brake caliper. The adjuster unit includes a gearwheel configured to be rotary driven in a first direction, and an adjuster nut operatively coupled with the gearwheel and configured to be operatively coupled with one of the brake pads, such that a rotational movement of the gearwheel in the first direction is converted, by the adjuster nut, into an axial movement of the brake pad towards the disc. The gearwheel is mounted in the brake caliper such that the gearwheel is axially fixed relative to the brake caliper, while the adjuster nut and the gearwheel are in an axially slidable engagement with respect to one another.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
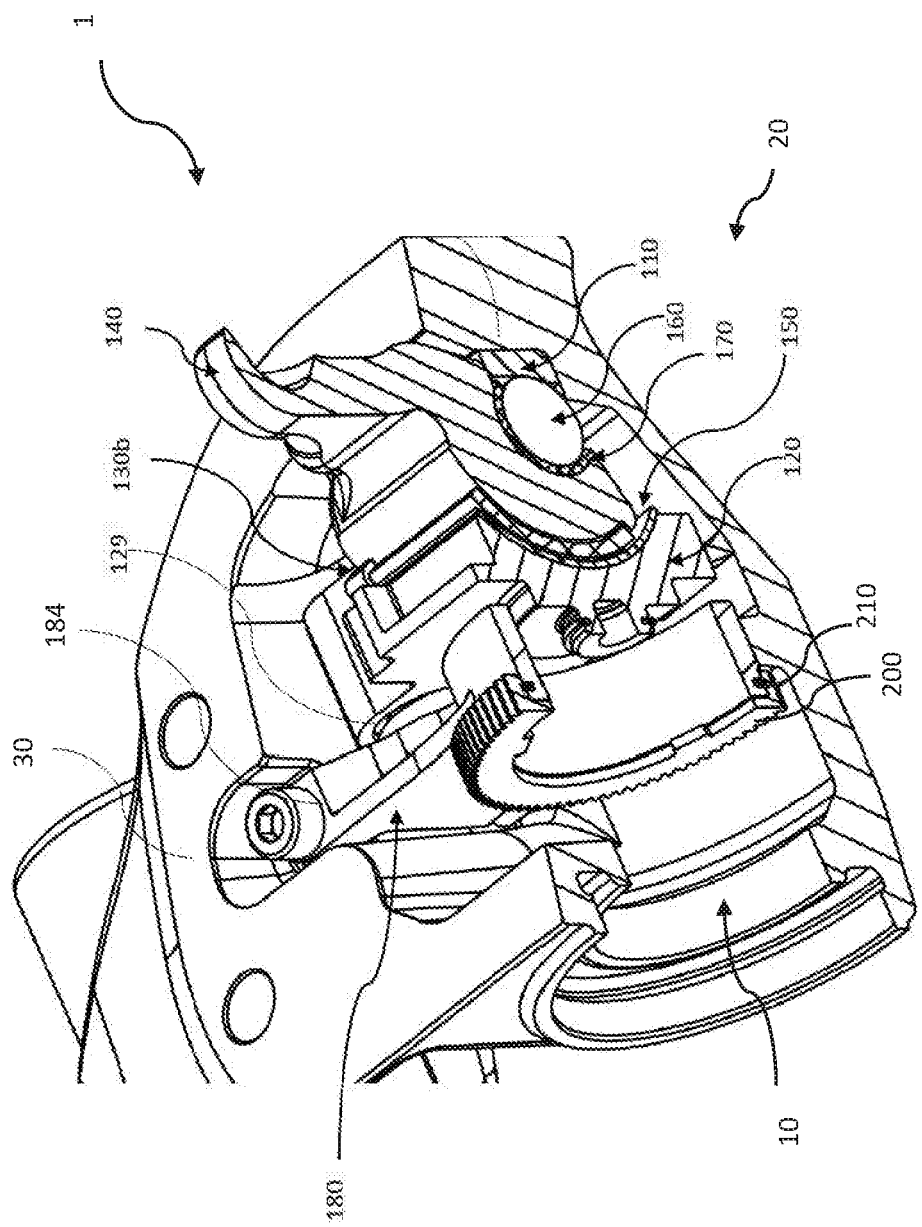
FIG. 1 shows a brake caliper according to a first embodiment in a perspective sectional view.

The present disclosure describes brake calipers that address the disadvantages mentioned above. In particular, the present disclosure provides a simplified assembly and increased safety against accidental disintegration during assembly and failure of the brake caliper.

The present disclosure describes mounting the gearwheel in the brake caliper such that the gearwheel is axially fixed relative to the brake caliper, while the adjuster nut and the gearwheel are in an axially slidable engagement with respect to one another. The disclosure advantageously recognizes that by mounting the gearwheel in the brake caliper such that the gearwheel is axially fixed relative to the brake caliper ensures that a failure of the brake caliper due to position deviations of the gearwheel is avoided. As the adjuster nut and the gearwheel are in an axially slidable engagement with respect to one another, the adjuster nut can be axially moved relative to the gearwheel for assembly and disassembly ensuring that the adjuster not is always correct positioned with respect to the gearwheel. Thus, the gearwheel is always able to transfer torque to the adjuster nut such that by rotation of the gearwheel in the first direction, the adjuster nut, preferably by means of an adjuster nut, axially moves the brake pad towards the brake disc.

In a preferred embodiment, the adjuster unit further comprises an adjuster screw being in threaded engagement with the adjuster nut and configured to operatively couple the adjuster nut with one of the brake pads.

Further preferred, the adjuster screw is operatively coupled to one of the brake pads, wherein a rotational movement of the adjuster nut advances an axial movement of the adjuster screw along the thread towards the brake disc.

In a further preferred embodiment, the adjuster nut is fixedly engaged with the brake pads by means of a coupling member, preferably the adjuster screw, such that by a rotation of the gearwheel and the adjuster nut in a second direction opposite to the first direction, the coupling member axially moves the brake pad away from the brake disc.

In a particular preferred embodiment, the adjuster unit further comprises a bracket mounted to the brake caliper, wherein the gearwheel is rotatable mounted to the bracket and axially fixed relative to the bracket. As the accessibility inside the brake caliper is limited, mounting the gearwheel to such a bracket outside the brake caliper reduces the risk of an incorrect installation of the gearwheel. Further, the manufacturing of the brake caliper is simplified because a bracket having no torque transmitting function is easier to mount to the brake caliper by conventional attachment means as for example screws.

Preferably, the bracket has a sliding surface for guiding the circumferential movement of the gearwheel. Thus, friction-resulting in loss of energy during the torque transmission from the gearwheel to the adjuster nut is reduced.

Preferably, the gearwheel and the bracket are coupled in a positive connection, preferably a snap-fit connection. The positive connection advantageously provides a fixation in the axial direction of the gearwheel relative to the bracket while at the same time allowing a rotational movement of the gearwheel in order to transmit a driving torque from an adjusting motor to the adjuster nut. A snap-fit connection thereby provides a simple to manufacture solution for such a positive connection that is further easy to assemble.

In a further preferred embodiment, the brake caliper further comprises a snap ring coaxially arranged to the gearwheel and configured to couple the bracket and the gearwheel in a positive connection. The snap ring provides a coupling member having a form corresponding to the gearwheel and being coaxially arranged to said gearwheel. Thus, a snap ring can be integrated in the assembly without requiring additional space.

Preferably, the snap ring is configured to fix the gearwheel axially relative to the brake caliper and to allow a predefined radial movement for adjusting the gearwheel. Thus, the correct positioning of the gearwheel in axial direction relative to the adjuster motor is ensured and at the same time, a radial movement for adjusting the gearwheel is allowed. Such an adjustment of the gearwheel may for example be required due to vibration during operation of the adjuster unit or due to wear and fatigue of the adjuster unit.

Preferably, the gearwheel has a circumferential groove for receiving the snap ring at least partly. Beneficially, the circumferential groove is easy to manufacture and provides an engagement with the snap ring that allows a rotational movement of the gearwheel relative to the snap ring and at the same time avoids an axial movement of the gearwheel relative to the snap ring and the brake caliper.

In a particular preferred embodiment, the bracket has a circumferential groove corresponding to the circumferential groove of the gearwheel, wherein the circumferential groove of the bracket is configured for receiving the snap ring at least partly. Thus, the snap ring engages the circumferential groove of the gearwheel and the circumferential groove of the bracket, thereby allowing a rotational movement of the gearwheel relative to the bracket and at the same time avoiding any movement in axial direction of the gearwheel relative to the bracket. Furthermore, such grooves are easy to manufacture and have a high accuracy ensuring an accurate positioning of the gearwheel relative to the adjuster motor.

In a further preferred embodiment, the brake caliper has a circumferential groove corresponding to the circumferential groove of the gearwheel, wherein the circumferential groove of the brake caliper is configured for receiving the snap ring at least partly. Thus, the snap ring engages the circumferential groove of the gearwheel and the circumferential groove of the brake caliper, thereby allowing a rotational movement of the gearwheel relative to the brake caliper and at the same time avoiding any movement in axial direction of the gearwheel relative to the brake caliper. Furthermore, such grooves are easy to manufacture and have a high accuracy ensuring an accurate positioning of the gearwheel relative to the adjuster motor.

Preferably, the bracket has a central angular aperture coaxially arranged to the gearwheel and the bracket being configured to receive the adjuster nut at least partly. Thus, the movement of the adjuster nut in axial direction is guided by the central annular aperture of the bracket. Furthermore, a compact arrangement of the bracket, the adjuster nut and the gearwheel is provided.

In a preferred embodiment, the adjuster nut has a threaded portion configured to be engaged with a corresponding threaded portion associated to the brake pads, preferably provided at the adjuster screw, such that a rotational movement of the adjuster nut results in an axial movement. Thus, the torque transferred by the gearwheel can be transmitted into a rotational movement of the adjuster nut converting the rotational movement into a linear movement of the brake pads towards the brake disc.

Preferably, the gearwheel has a guiding member and the adjuster nut has a corresponding guiding grove extending in axial direction, wherein the guiding groove is configured for being in a sliding engagement with the guiding member. Thus, the circumferential movement of the adjuster nut in axial direction is limited by the gearwheel. Furthermore, such a guiding member provides a sufficient engagement for transmitting a driving torque from the gearwheel to the adjuster nut such that the gearwheel and the adjuster nut are rotating together due to the driving torque applied by the adjuster motor.

An embodiment of the invention has herein above been described in a first aspect with respect to a brake caliper.

In a second aspect, the invention also relates to an adjuster unit for a brake caliper of a vehicle brake, the vehicle brake having a pair of brake pads configured to be coupled to the brake caliper and a disc positioned in between the brake pads, wherein the adjuster unit is configured to be mounted to the brake caliper, the adjuster unit comprising: a gearwheel configured for being rotary driven in a first direction, and an adjuster nut operatively coupled with the gearwheel and configured to be operatively coupled with one of the brake pads, such that the rotational movement of the gearwheel in the first direction is converted by the adjuster nut into an axially movement of the brake pad towards the disc.

According to the second aspect, the gearwheel is configured to be mounted in the brake caliper such that the gearwheel is axially fixed relative to the brake caliper, while the adjuster nut and the gearwheel are in an axially slidable engagement with respect to one another.

The benefits and preferred embodiments of the brake caliper of the first aspect described above are also benefits and preferred embodiments of the vehicle brake of the second aspect having such a brake caliper and vice versa.

In a preferred embodiment, the adjuster unit further comprises an adjuster screw being in threaded engagement with the adjuster nut and configured to operatively couple the adjuster nut with one of the brake pads.

Further preferred, the adjuster screw is operatively coupled to one of the brake pads, wherein a rotational movement of the adjuster nut advances an axial movement of the adjuster screw along the thread towards the brake disc.

In a further preferred embodiment, the adjuster nut is fixedly engaged with the brake pads by means of a coupling member, preferably the adjuster screw, such that by a rotation of the gearwheel and the adjuster nut in a second direction opposite to the first direction, the coupling member axially moves the brake pad away from the brake disc.

In a third aspect, a gearwheel for an adjuster is configured to control the air gap between a pair of brake pads and a brake disc of a vehicle brake, wherein the gearwheel is configured for being rotary driven in a first direction and in a second direction, the adjuster unit comprising: a gearwheel configured for being rotary driven in a first direction, and an adjuster nut operatively coupled with the gearwheel and configured to be operatively coupled with one of the brake pads, such that the rotational movement of the gearwheel in the first direction is converted by the adjuster nut into an axially movement of the brake pad towards the disc.

According to the third aspect, the gearwheel is configured to be mounted in the brake caliper such that the gearwheel is axially fixed relative to the brake caliper, while the gearwheel is configured for being in an axially slidable engagement with respect to the adjuster nut. The benefits and preferred embodiments of the brake caliper of the first aspect described above are also benefits and preferred embodiments of the gearwheel of the third aspect and vice versa.

The coupling of the adjuster nut and the brake pads is preferably provided by means of an adjuster screw being in threaded engagement with the adjuster nut and operatively coupled to one of the brake pads, such that a rotational movement of the adjuster nut advances an axial movement of the adjuster screw along the thread towards the brake disc.

In a fourth aspect, an adjuster nut for an adjuster unit is provided, the adjuster unit comprising: a gearwheel configured for being rotary driven in a first direction, and an adjuster nut operatively coupled with the gearwheel and configured to be operatively coupled with one of the brake pads, such that the rotational movement of the gearwheel in the first direction is converted by the adjuster nut into an axially movement of the brake pad towards the disc.

According to the fourth aspect, the adjuster nut is configured for being in an axially slidable engagement with respect to the gearwheel. The benefits and preferred embodiments of the brake caliper of the first aspect described above are also benefits and preferred embodiments of the adjuster nut for such an adjuster unit of the fourth aspect and vice versa.

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further, the features described in the description, the drawings and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

FIG. 1 shows a brake caliper 1 having an adjuster unit 10 and preferably a pre-assembly 20 coupled to the adjuster unit 10.

The brake caliper 1 further comprises a brake caliper housing 30 configured to receive the adjuster unit 10 and preferably the pre-assembly 20 at least partly and to support the pressure piece 110 at least in the thrust direction A.

The adjuster unit 10 is coupled to the pre-assembly 20 for adjusting the air gap between a pair of brake pads operatively coupled to the thrust piece 120 and a brake disc of the vehicle brake.

The adjuster unit 10 comprises a mounting bracket 180 operatively coupled to the thrust piece 120 by means of two spring elements 190 applying a retention force on the thrust piece 120 in the thrust direction A towards the pressure piece 110.

The adjuster unit 10 further comprises a gearwheel 200 configured for being rotary driven in a first direction and in a second direction, and an adjuster nut 220 (see FIG. 5) operatively coupled with the gearwheel 200 by means of a snap ring 210.

The mounting bracket 180 comprises a number of spring seats 182 configured to receive the spring elements 190 at least partly and the mounting bracket 180 further comprises two mounting interfaces 184 configured to receive fixing means, preferably a screw, to couple the mounting bracket 180 to the brake caliper 1.

The bracket 180 further has a central annular aperture 186 coaxially arranged to the gearwheel 200 and being configured to receive an adjuster nut 220 (see FIG. 5) at least partly.

Figure 2:
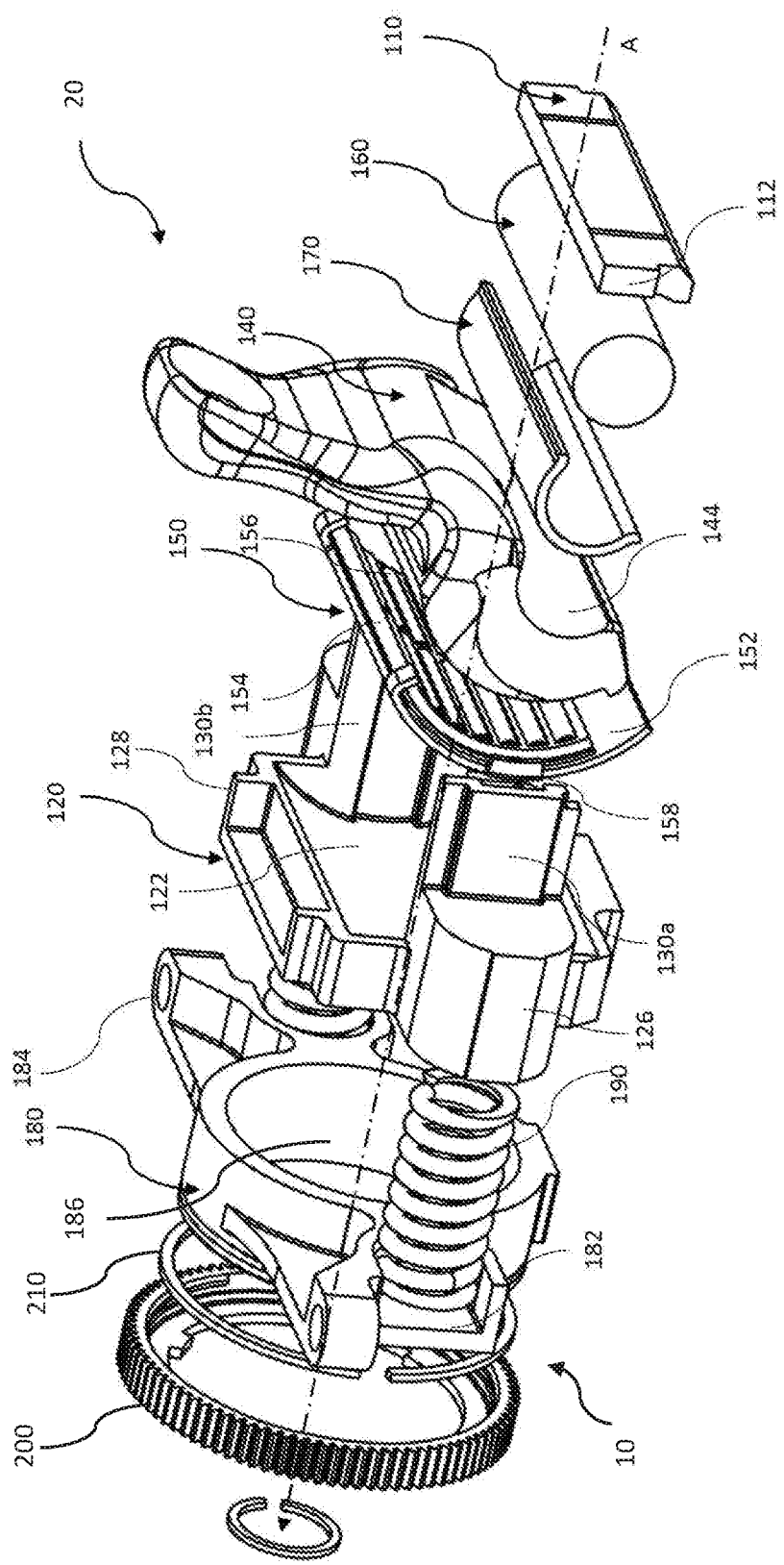
FIG. 2 shows an adjuster unit and a pre-assembly for the brake caliper of FIG. 1 in an exploded view.
Figure 3:
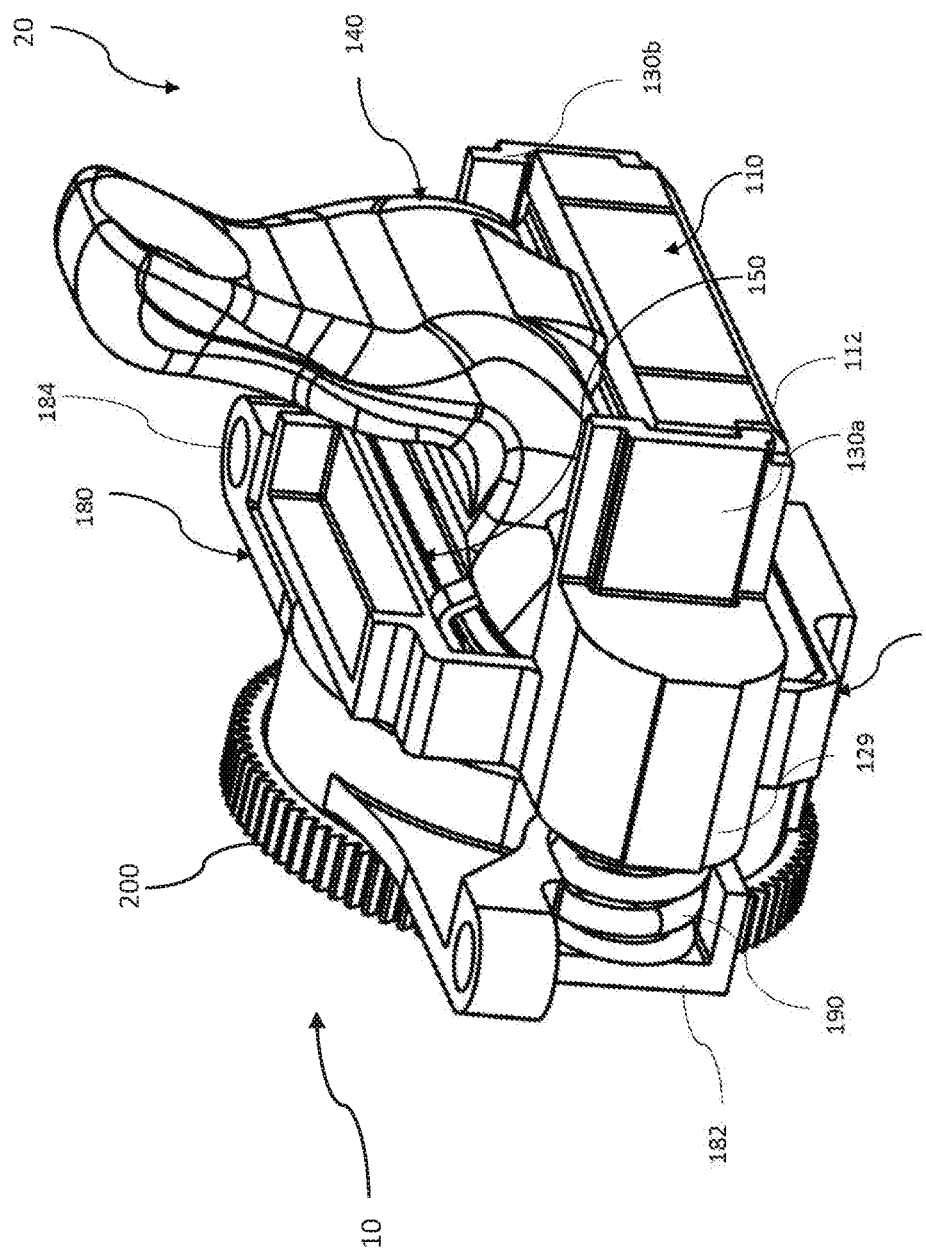
FIG. 3 shows an adjuster unit and a pre-assembly for the brake caliper of FIG. 1 in a first perspective view.
Figure 4:
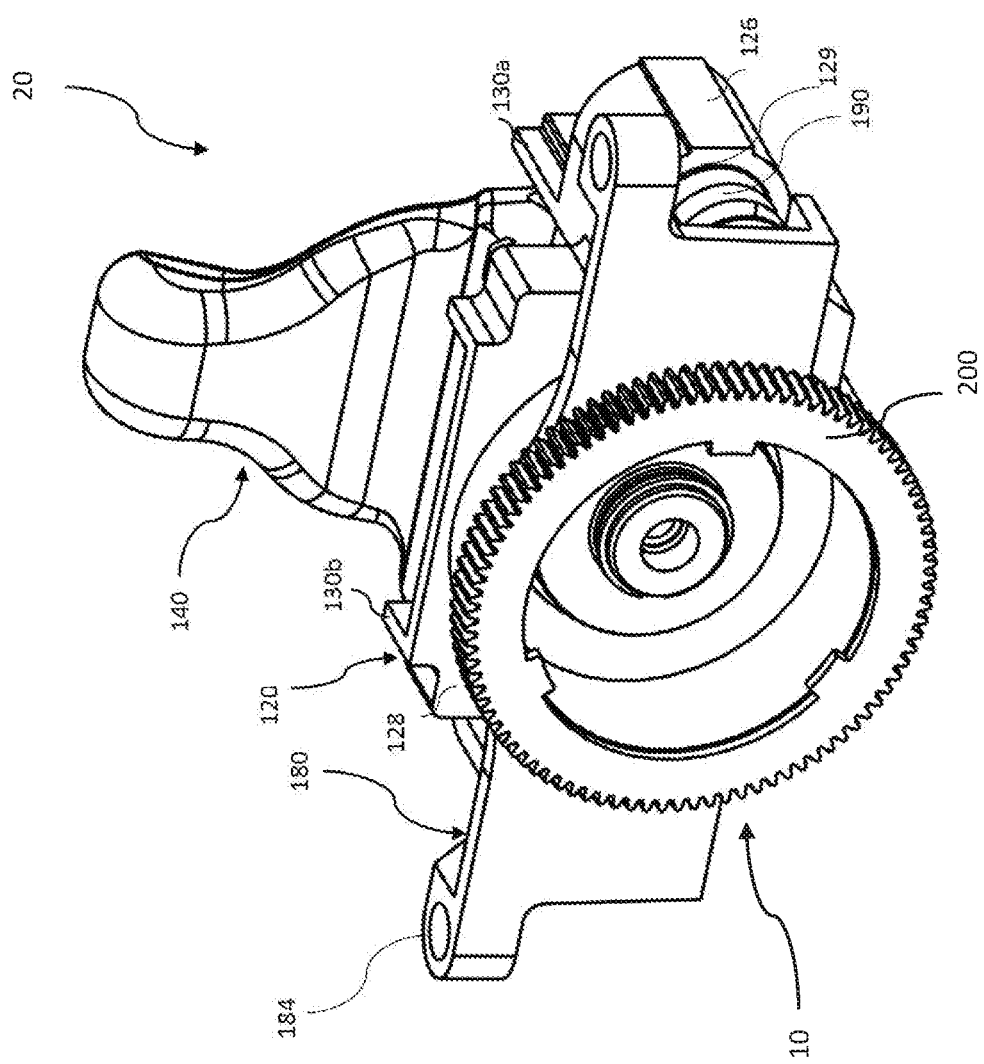
FIG. 4 shows the adjuster unit and a pre-assembly for the brake caliper of FIG. 1 in a second perspective view.

FIGS. 2 to 4 illustrate the adjuster unit 10 that is configured to be installed in the brake caliper 1 (see FIG. 1) of a vehicle brake.

The adjuster unit 10 is coupled to the pre-assembly 20. The pre-assembly 20 comprises a pressure piece 110 and a thrust piece 120, wherein the thrust piece 120 is configured to move axially relative to the pressure piece 110 in a thrust direction A to transmit a braking force. The pre-assembly 20 further comprises a guiding member 130a, b configured to limit the movement of the thrust piece 120 relative to the pressure piece 110 in at least one direction orthogonal to the thrust direction A.

According to this embodiment, the guiding member 130 is configured to limit the movement of the thrust piece 120 relative to the pressure piece 110 in a first and in a second direction orthogonal to the thrust direction A.

The pre-assembly 20 further comprises a lever 140 pivotally supported against the thrust piece 120 by means of a pivot bearing 150. The lever 140 is supported along its rotation axis against a rolling member 160 by means of a second pivot bearing 170.

The pressure piece 110 comprises a mounting member 112 configured to be engaged with the guiding member 130.

The thrust piece 120 comprises a support surface 122 having an at least partly cylindrical shape that corresponds to the form of the first pivot bearing 150. The thrust piece 120 further comprises a first lateral side 126 and a second lateral side 128. A spring seat (not shown) is disposed at each of the first and second lateral sides 126, 128 to receive a spring element 190 at least partly.

The guiding member 130a is a first guiding member disposed at the first lateral side 126 of the thrust piece 120. The pre-assembly 20 further comprises a second guiding member 130b disposed at the second lateral side 128. The thrust piece 120 and the first and second guiding members 130a, b are formed as one integral part configured to move axially relative to the pressure piece in the thrust direction A to transmit the braking force and also to limit the movement of the thrust piece relative to the pressure piece in the direction extending from the first lateral side 126 to the second lateral side 128 of the thrust piece 120.

The lever 140 comprises a first bearing surface (not shown) configured to be in contact with the first bearing 150 and a second bearing surface 144 configured to be in contact with the second pivot bearing 170.

The first pivot bearing 150 comprises a bearing housing 152 forming the backside of the pivot bearing 150 and being in contact with the support surface 122 of the thrust piece 120. The bearing housing 152 is coupled to a bearing cage 154 having a number of rolling elements 156 configured to pivotally support the lever 140. The pivot bearing 150 further comprises a mounting member 158 configured to be engaged with the guiding member 130a, b at least in a positive fit.

The rolling member 160 is cylindrically formed configured to pivotally support the lever 140 against the pressure piece 110.

Figure 5:
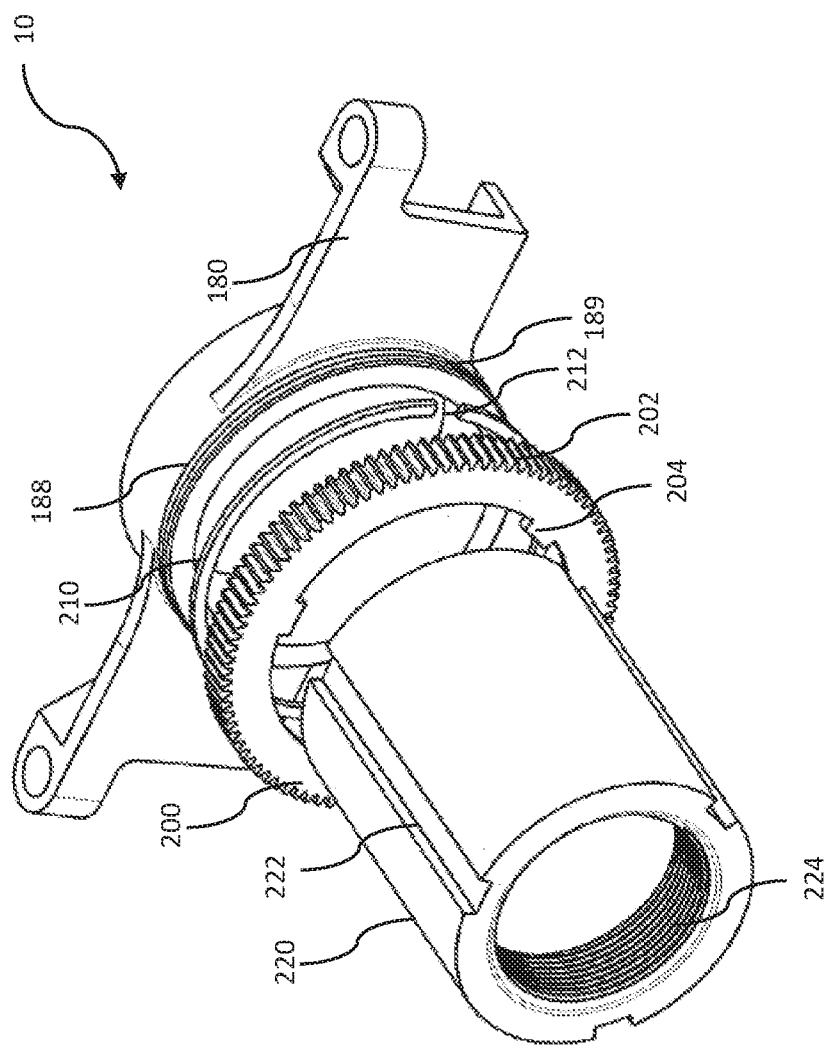
FIG. 5 shows the adjuster unit for the brake caliper of FIG. 1 in a first perspective view.
Figure 6:
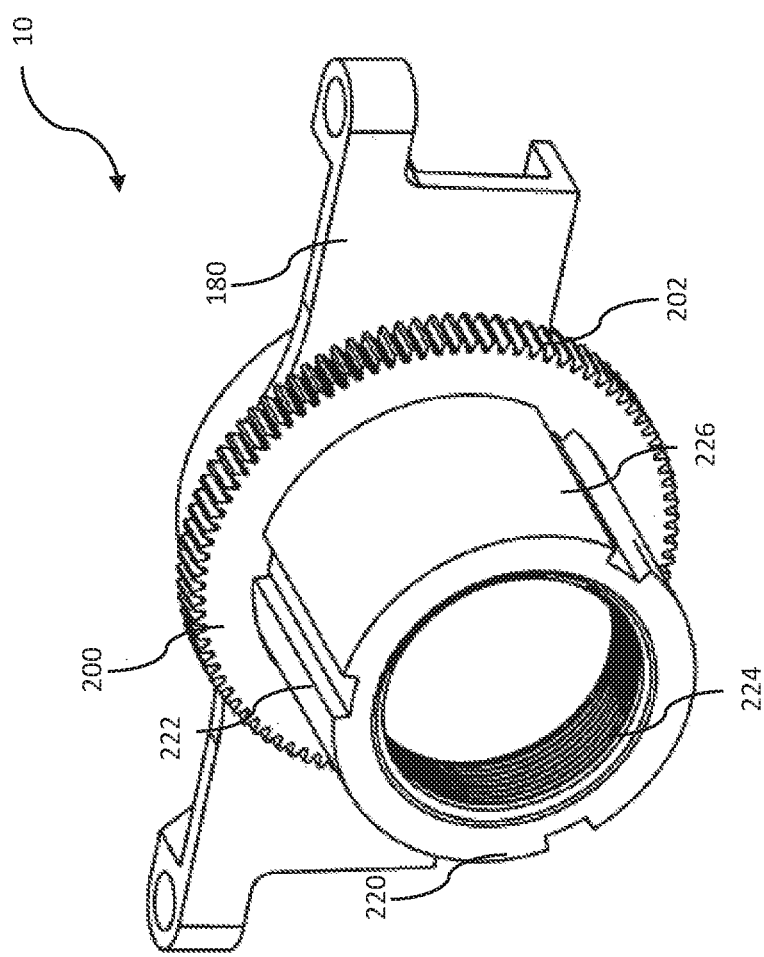
FIG. 6 shows the adjuster unit for the brake caliper of FIG. 1 in a second perspective view.
Figure 7:
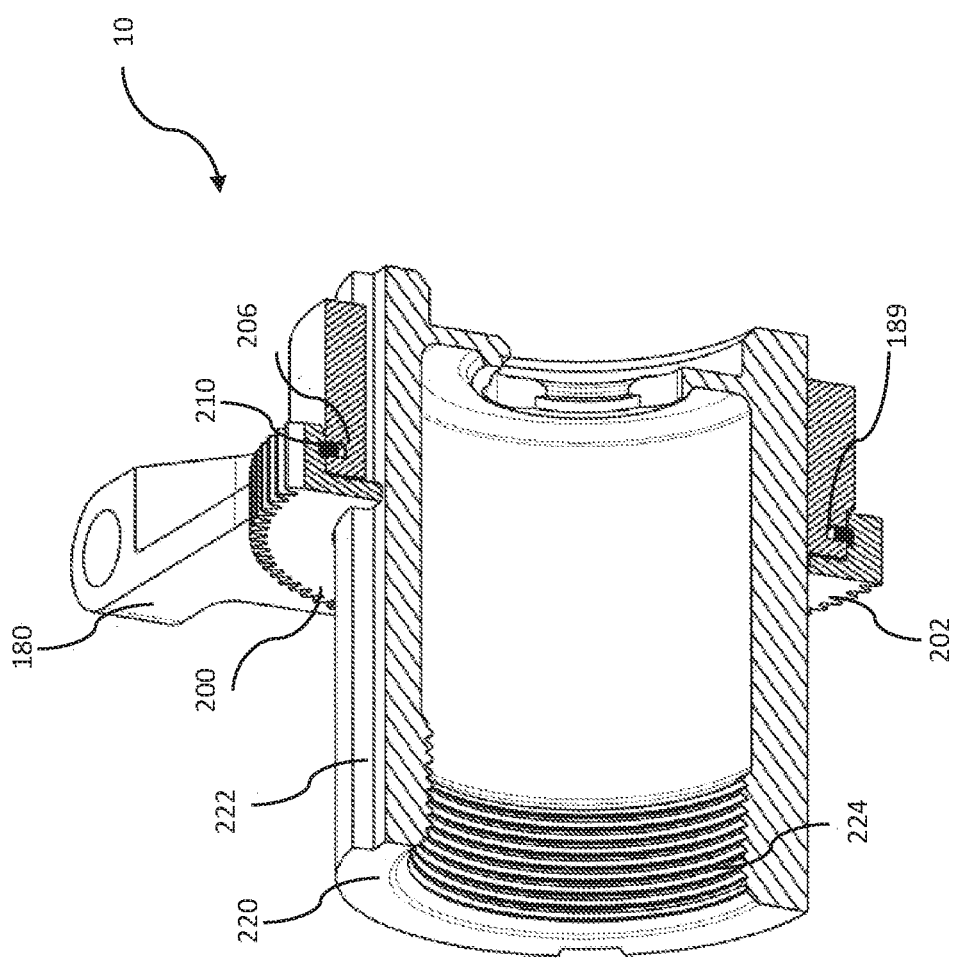
FIG. 7 shows the adjuster unit for the brake caliper of FIG. 1 in a sectional view.

FIGS. 5 to 7 illustrate the adjuster unit 10.

The adjuster unit 10 comprises the bracket 180 and the gearwheel 200 mounted to the bracket 180 by means of a snap ring 210. The adjuster unit 10 further comprises the adjuster nut 220 being in axially slideable engagement with the gearwheel 200.

The bracket 180 has a sliding surface 188 for guiding the circumferential movement of the gearwheel 200.

The gearwheel 200 as a toothing 202 configured for being engaged with an adjuster motor (not shown) for transmitting a torque.

The gearwheel 200 further has a number of guiding members 204 configured for being engaged with an adjuster nut 220. The guiding members 204 of the gearwheel 200 are arranged along an inner circumference of the gearwheel 200 and extend radially inwards.

The snap ring 210 is coaxially arranged to the bracket 180, the driving wheel 200 and the adjuster nut 220. The snap ring 210 is radially movable received in the grooves 189, 206, such that a predefined radial movement of the gearwheel 200 relative to the brake caliper 1 (see FIG. 1) is allowed in order to adjust the gearwheel 200. The snap ring 210 has an interruption 212 configured to allow the radial displacement by applying a circumferential movement.

The adjuster nut 220 is configured to be operatively coupled with one of the brake pads, such that by rotation of the gearwheel 200 in the first direction, the adjuster nut 200, preferably by means of an adjuster screw (not shown) being in threaded engagement with the adjuster nut 220, moves the brake pad along the axis A towards the disc.

Preferably by rotation of the gearwheel 200 in the second direction opposite of the first direction, the adjuster nut 220, preferably by means of the adjuster screw (not shown), axially moves the brake pad away from the disc.

The adjuster nut 220 has an axially extending groove 222 that corresponds to the guiding member 204 (see FIG. 5) of the gearwheel 200.

The guiding grooves 222 are arranged along a circumferential surface 226 of the adjuster nut 200 being spaced apart from each other in the circumferential direction. The grooves 222 are configured to be engaged with a guiding member 204 of the gearwheel 200 thereby allowing an axial movement of the adjuster nut 220 relative to the gearwheel 200.

The adjuster nut 220 and the gearwheel 200 are in an slidable engagement, such that the adjuster nut 220 can move axially relative to the gearwheel 200 when an actuation force is applied by the lever 140 (see FIG. 4) on the thrust piece 120 (see FIG. 4) advancing the adjuster nut 220 towards the brake disc (not shown). By moving the adjuster nut 220 towards the brake disc (not shown) one of the brake pads (not shown) operatively coupled to the adjuster nut 220 by means of a coupling member, preferably an adjuster screw, is moved towards the brake disc.

The adjuster nut 220 further has a threaded portion 224 that is configured to be operatively coupled to at least one of the brake pads, preferably by means of the adjuster screw (not shown), such that a rotational movement of the adjuster nut 220 causes at least one of the brake pads to move towards the disc in order to control the air gap between the brake pads and the brake disc.

The threaded portion 224 is formed as an internal thread configured to be operatively coupled to at least one of the brake pads by a coupling member, preferably the adjuster screw (not shown) being in threaded engagement with the threaded portion 224.

As shown in FIG. 7, the gearwheel 200 has a circumferential groove 202 configured to receive the snap ring 210 at least partly. Furthermore, the bracket 180 has a corresponding circumferential groove 189 that is also configured to receive the snap ring at least partly such that the gearwheel 200 and the bracket 180 are coupled in a positive fit by means of the snap ring 210.

Figure 8:
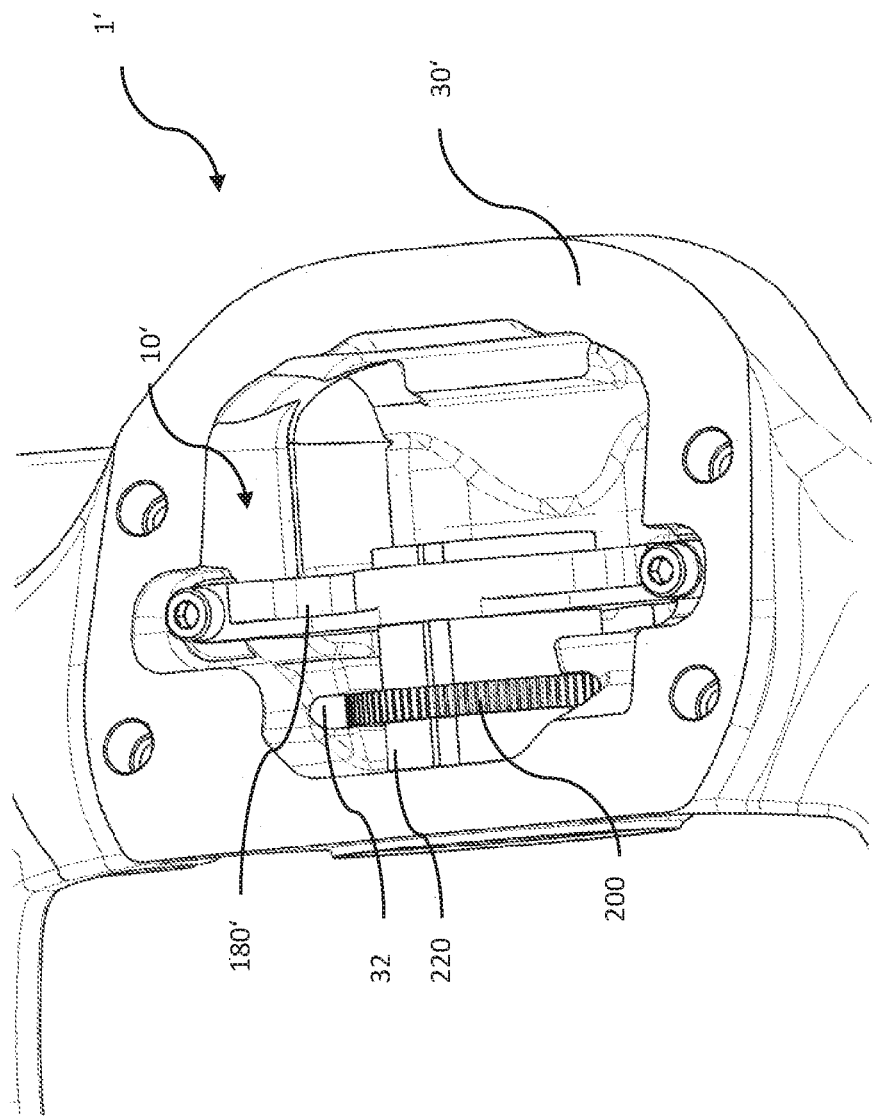
FIG. 8 shows a brake caliper according to a second embodiment in a perspective view.
Figure 9:
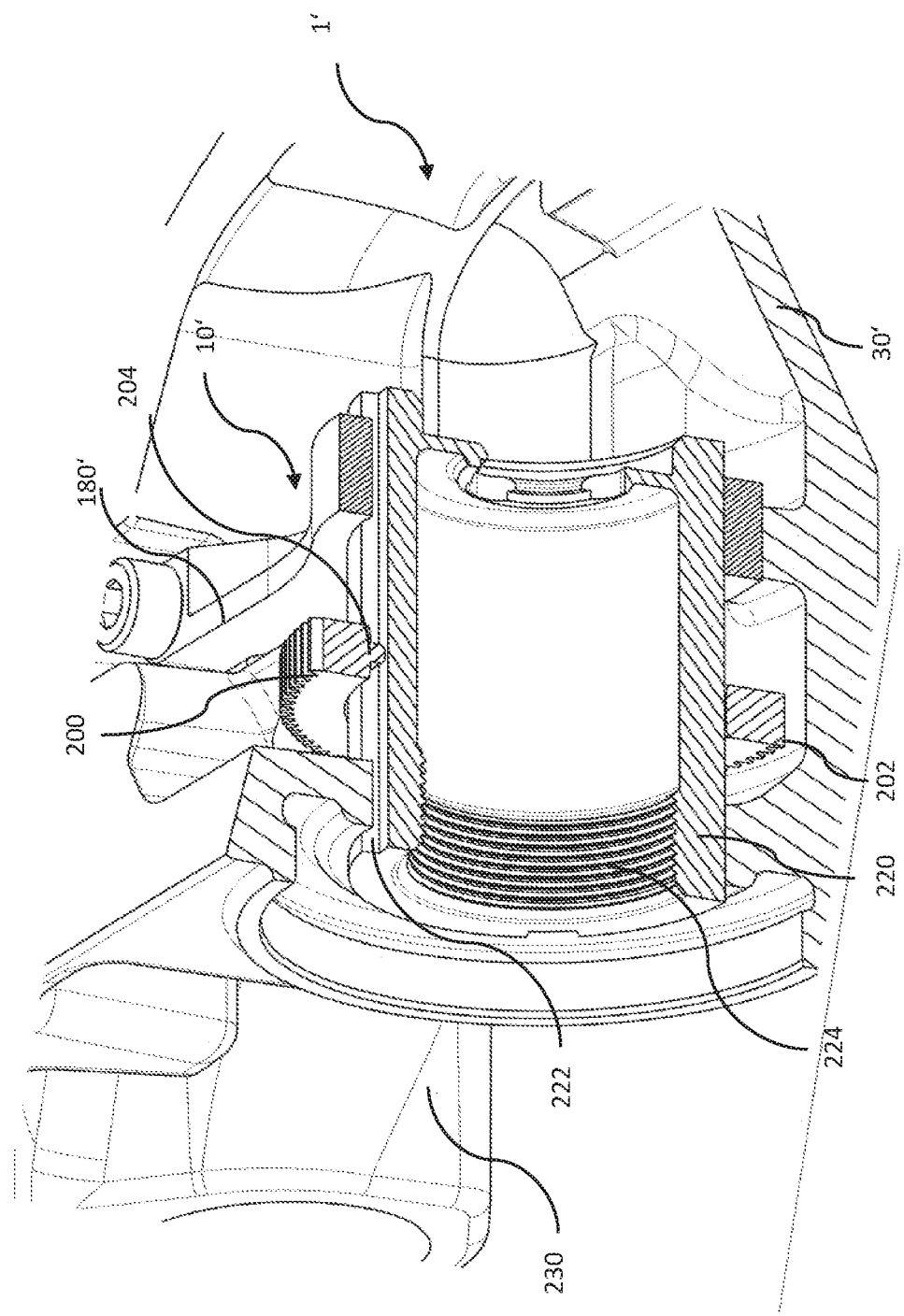
FIG. 9 shows the brake caliper of FIG. 8 in a first perspective sectional view.
Figure 10:
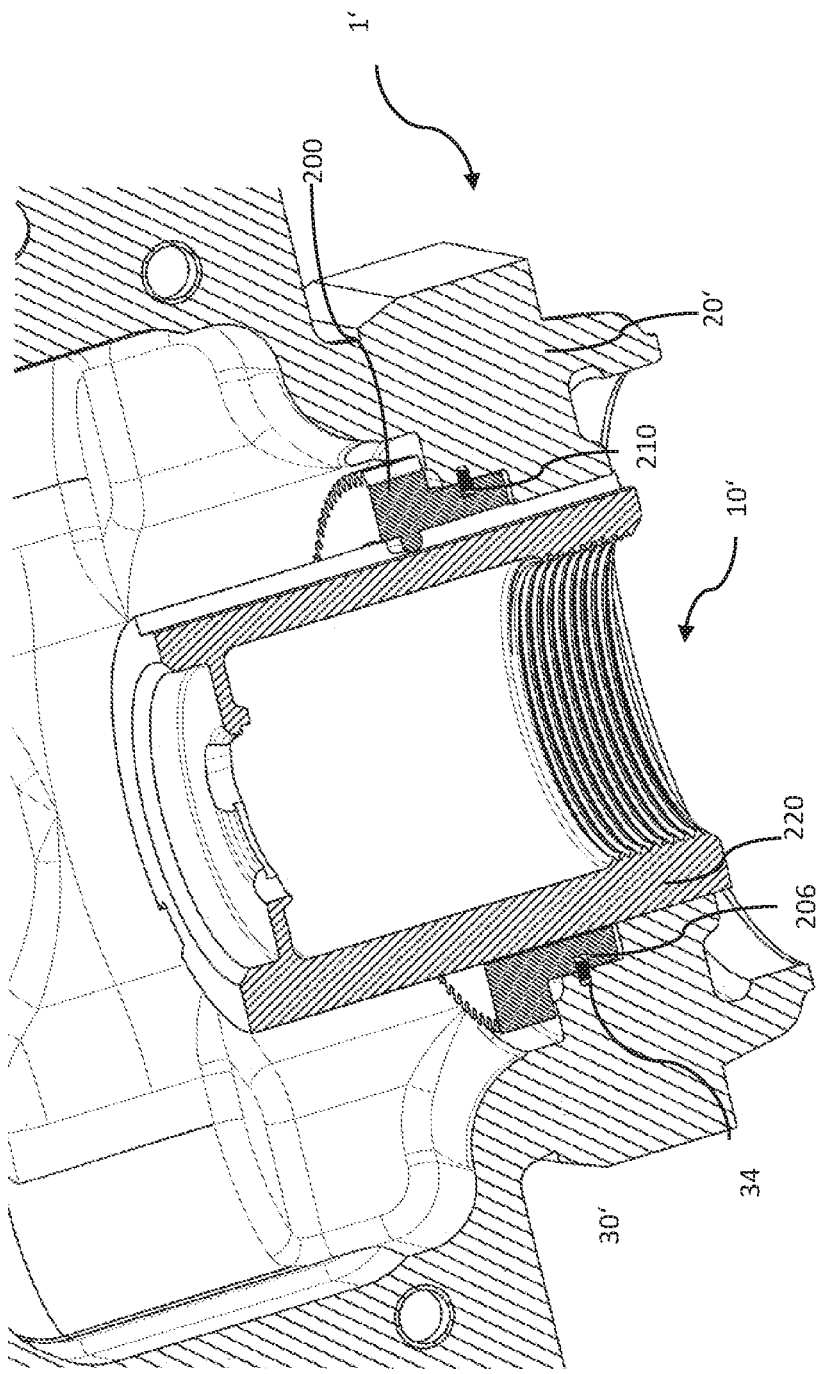
FIG. 10 shows the brake caliper of FIG. 8 in a second perspective sectional view.

FIGS. 8 to 10 illustrate the brake caliper 1' having an adjuster unit 10' according to a second preferred embodiment.

The adjuster unit 10' differs from the adjuster unit 10 according to the first embodiment in that the gearwheel 200 is rotatable mounted in the brake caliper 1' and axially fixed relative to the brake caliper 1'.

The brake caliper 1', in particular the brake caliper housing 30' has a recess 32 configured to receive the gearwheel 200 at least partly such that the gearwheel 200 is coupled to the brake caliper 1' in a positive connection.

The gearwheel 200 is received in the recess 32 such that the gearwheel 200 is axially fixed relative to the brake caliper 1', while the adjuster nut 220 and the gearwheel 200 are in an axially slideable engagement with respect to one another.

As in particular shown in FIG. 10, the brake caliper housing 30' has a groove 34 being configured to receive the snap ring 210 at least partly. The gearwheel 200 has a corresponding circumferential groove 206 that is also configured to receive the snap ring 210 at least partly. The snap ring 210 is radially movable received in the grooves 34, 206, such that a predefined radial movement of the gearwheel 200 relative to the brake caliper 1' is allowed in order to adjust the gearwheel 200.

In the following, the function of the adjuster unit 10, 10' for a vehicle brake will be described according to the preferred embodiments shown in FIGS. 1 to 7 and 8 to 10.

When a driving torque is applied to the gearwheel 200 by an adjuster motor (not shown) being engaged with the outer toothing 202 of the gearwheel, the gearwheel 200 rotates in a first direction. The gearwheel 200 is in a slideable engagement with the adjuster nut 220. The adjuster nut 220 is configured to be operatively coupled with one of the brake pads, such that by rotation of the gearwheel 200 in the first direction, the adjuster nut 200, preferably by means of an adjuster screw (not shown), moves the brake pad along the axis A towards the disc.

Preferably, by rotation of the gearwheel 200 in the second direction opposite of the first direction, the adjuster nut 220, preferably by means of an adjuster screw (not shown), axially moves the brake pad away from the disc.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 1' brake caliper
10, 10' adjuster unit
20 preassembly
30, 30' brake caliper housing
32 recess
34 groove
110 pressure piece
112 mounting member
120 thrust piece
122 support surface
126 first lateral side
128 second lateral side
129 spring seat
130a, 130b guiding member
140 lever
144 second bearing surface
150 (first) pivot bearing
152 bearing housing
154 bearing cage
156 rolling elements
158 mounting member
160 rolling member
170 second pivot bearing
180 mounting bracket
182 spring seats
184 mounting-interface, bore
186 central annular aperture
188 sliding surface
189 circumferential groove
190 spring element
200 gearwheel
202 toothing
204 guiding member
206 circumferential groove
210 snap ring
212 interruption
220 adjuster nut
222 guiding groove
224 threaded portion
A thrust direction

What is claimed is:

1. A brake caliper for a vehicle brake, the vehicle brake having a pair of brake pads configured to be coupled to the brake caliper and a disc positioned in between the brake pads,
the brake caliper comprising:
a bracket mounted to the brake caliper, and
an adjuster unit mounted to the brake caliper, the adjuster unit comprising:
a gearwheel configured to be rotary driven in a first direction, and
an adjuster nut operatively coupled with the gearwheel and configured to be operatively coupled with one of the brake pads, such that a rotational movement of the gearwheel in the first direction is converted, by the adjuster nut, into an axial movement of the brake pad towards the disc,
wherein the gearwheel is mounted in the brake caliper such that the gearwheel is axially fixed relative to the brake caliper, while the adjuster nut and the gearwheel are in an axially slidable engagement with respect to one another, and wherein the gearwheel is rotatable mounted to the bracket and axially fixed relative to the bracket.

2. The brake caliper according to claim 1, wherein the brake caliper further comprises a snap ring coaxially arranged to the gearwheel and being configured to couple the bracket and the gearwheel in a positive connection.

3. The brake caliper according to claim 2, wherein the gearwheel has a circumferential groove for receiving the snap ring at least partly.

4. The brake caliper according to claim 3, wherein the bracket has a circumferential groove corresponding to the circumferential groove of the gearwheel, wherein the circumferential groove of the bracket is configured for receiving the snap ring at least partly.

5. The brake caliper according to claim 3, wherein the brake caliper has a circumferential groove corresponding to the circumferential groove of the gearwheel, wherein the circumferential groove of the brake caliper is configured for receiving the snap ring at least partly.

6. The brake caliper according to claim 2, wherein the snap ring is configured to fix the gearwheel axially relative to the brake caliper and to allow a predefined radial movement for adjusting the gearwheel.

7. The brake caliper according to claim 1, wherein the adjuster nut has a threaded portion configured such that a rotational movement of the adjuster nut results in an axial movement of at least one of the brake pads.

8. The brake caliper according to claim 7, wherein the gearwheel has a guiding member, and wherein the adjuster nut has a corresponding guiding groove extending in axial direction, the guiding groove being configured to be in a sliding engagement with the guiding member.

9. The brake caliper according to claim 1, wherein the bracket has a sliding surface configured to guide a circumferential movement of the gearwheel.

10. The brake caliper according to claim 1, wherein the gearwheel and the bracket are coupled in a positive connection.

11. The rake caliper according to claim 1, wherein the bracket has a central annular aperture coaxially arranged to the gearwheel and being configured to receive the adjuster nut at least partly.

* * * * *